United States Patent
Melnik et al.

(10) Patent No.: US 6,473,149 B2
(45) Date of Patent: *Oct. 29, 2002

(54) ELIMINATION OF THE REVERSE-TILT IN HIGH-DENSITY REFLECTIVE LCDS

(75) Inventors: George A. Melnik, Montrose, NY (US); Robert H. Kane, Ho-Ho-Kus, NJ (US); Ronald D. Pinker, Peekskill, NY (US); Gerard Cnossen, Opeinde (NL)

(73) Assignee: Koninklijke Phillips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,411

(22) Filed: Jul. 24, 1998

(65) Prior Publication Data

US 2001/0046023 A1 Nov. 29, 2001

(51) Int. Cl.$^7$ ...................... G02F 1/1339; G02F 1/1333
(52) U.S. Cl. ........................ 349/155; 349/86; 349/156; 349/157
(58) Field of Search .......................... 349/156, 86, 155, 349/157

(56) References Cited

U.S. PATENT DOCUMENTS

| | | | | |
|---|---|---|---|---|
| 4,989,955 A | * | 2/1991 | Ito et al. | 349/157 |
| 5,268,782 A | * | 12/1993 | Wenz et al. | 349/156 |
| 5,706,109 A | | 1/1998 | Yamada et al. | 359/81 |
| 5,726,728 A | * | 3/1998 | Kondo et al. | 349/156 |

FOREIGN PATENT DOCUMENTS

| | | | | |
|---|---|---|---|---|
| EP | 0 040 308 | * | 11/1981 | 349/155 |
| JP | 2-196221 | * | 8/1990 | |
| JP | 4-238325 | * | 8/1992 | 349/155 |
| JP | 9288277 | | 4/1996 | |

* cited by examiner

Primary Examiner—William L. Sikes
Assistant Examiner—Tarifur R. Chowdhury
(74) Attorney, Agent, or Firm—Aaron Waxler

(57) ABSTRACT

An LCD having the liquid crystal in at least a portion of the interpixel region displaced by a spacer material. The spacer material has a low dielectric constant relative to the liquid crystal, thus further impeding the formation of a bend deformation in the liquid crystal in the interpixel region when pixels on opposite sides of the spacer material are operating in the inversion mode. This elimination of the bend deformation in the interpixel region eliminates the reverse tilt disclination.

20 Claims, 5 Drawing Sheets

ELIMINATION OF THE REVERSE-TILT IN HIGH-DENSITY REFLECTIVE LCDS

BACKGROUND AND SUMMARY OF THE INVENTION

This invention generally pertains to the field of liquid crystal displays (LCDs). In particular, the invention relates to high density reflective LCDs and improving their quality and efficiency.

High density reflective LCDs are generally known. FIG. 1 shows a partial cross-section of a generic embodiment of a prior art high density reflective LCD. Generally, the LCD is supported by a silicon substrate 10. Secondary electrodes 12a, 12b, 12c are fabricated on or within substrate 10. Above substrate 10 is liquid crystal 14, which is contained by transparent electrode 16. Above transparent electrode is a second substrate 18, also transparent.

Fabricated below secondary electrode 12a, 12b, 12c in substrate 10 are electronic circuits 20a, 20b, 20c, which interface with secondary electrodes 12a, 12b, 12c. Such electronic circuits 20a, 20b, 20c are also known in the art, and provide a voltage level at the respective secondary electrode 12a, 12b, 12c that alters the state of the liquid crystal 14 adjacent the electrodes 12a, 12b, 12c. (Such secondary electrodes are referred to as "pixels" by those skilled in the art.)

It is the state of the liquid crystal 14 that determines whether and how much light is transmitted. As noted above, the embodiment shown in FIG. 1 is a reflective LCD. Thus, polarized light is projected downward through substrate 18 and transparent electrode 16. If the liquid crystal 14 above the secondary electrode 12a, for example, is in a transmissive state, then the polarization of the light is altered as it passes through the liquid crystal 14 and reflected by secondary electrode 12a. This change in polarization allows the light to transmit through a polarizer positioned externally (not shown in FIG. 1) and, consequentally, the pixel appears bright.

On the other hand, if the liquid crystal 14 above secondary electrode 12a is not in a transmissive state, then the polarization of the light incident on secondary electrode 12a is unaltered and no light passes the external polarizer. Consequently, the pixel corresponding to electrode 12a is dark.

The LCD, of course, is made up of an array of many secondary electrodes (or pixels), such as electrodes 12b and 12c shown in the cross-section of FIG. 1. The states of these electrodes, and the corresponding state of the liquid crystal 14 above each one, will determine the state of the corresponding pixel. Also, as described further below, the state of the liquid crystal 14 may also provide for partial transmission of the light, resulting in a lower intensity glow of the respective pixel.

FIG. 2 is a top view of the array of an LCD such as that shown in partial cross-section in FIG. 1. The pixels of the display corresponding to secondary electrodes 12a, 12b, 12c are marked in FIG. 2. From this perspective, the driving electronics 20a, 20b, 20c would be beneath the electrodes 12a, 12b, 12c and, because of this, the pixels can be positioned closer together on the substrate, resulting in a high "fill" factor. (Fill is defined as the area of the secondary electrodes or pixels divided by the area of the supporting substrate. In FIG. 2, this would be equivalent to the square of the width of an electrode (w) divided by the square of the pitch.) A high density reflective LCD can have a fill factor on the order of 0.9 and higher.

Also visible in FIG. 2 are a series of "spacer beads." The spacer posts are not visible in the cross-sectional illustration of FIG. 1, but serve to set the liquid crystal cell gap between secondary electrodes 12a, 12b, 12c and common electrode 16. The spacer beads shown in FIG. 2 are comprised of a series of plastic beads that are randomly positioned between the substrates 10, 18. The spacer posts can be constructed by depositing and patterning an insulating later on the substrate 10. The beads set the liquid crystal cell gap. The beads can be seen when the display is in operation, so reduction of the number of beads needed to set the liquid crystal gap has been pursued.

Referring to FIG. 3, a schematic of the state of the liquid crystal 14 directly above secondary electrode 20a is shown as a function of the voltage of the secondary electrode. (The portion of the liquid crystal 14 shown in FIG. 3 corresponds to the dashed area shown in FIG. 1.)

The alignment of the liquid crystal molecules when there is a low voltage (referred to as "0 V") is shown in cross-section to be tilted with respect to the axis between the secondary electrode 12a and the transparent electrode 16. (If viewed from above, the molecules would form a helical structure.) In the "relaxed" state shown, light is transmitted; thus, the liquid crystal shown in FIG. 3 is "normally transmissive."

When a "high" voltage is applied, shown in FIG. 3 to be 6V or higher, the liquid crystal aligns substantially normal to electrodes 12a, 16, or, equivalently, substantially parallel to the electric field between the electrodes. Such alignment of the liquid crystal corresponds to a "dark state" of the liquid crystal, where little or no light is transmitted.

Referring to FIG. 4, the alignment of the liquid crystal is shown for adjacent electrodes both having a "high" voltage magnitude, but where one voltage is positive and one is negative. Adjacent electrodes in this state are referred to as bring in an "inversion mode."

Such application of opposing voltage is routinely practiced in the LCD arts and is for the purpose of reducing artifacts such as flicker and improving the overall uniformity of the display.

The liquid crystal generally designated as being in the "central" regions of both electrodes 12a, 12b in FIG. 4 are similarly aligned to give a dark state, like the alignment corresponding to 6V as shown in FIG. 3. The normal tilt inclination of the liquid crystal is the same in the central regions above both electrodes 12a and 12b, even though the potentials of the electrodes are 6V and −6V, respectively.

The region spanning the gap between the electrodes 12a, 12b is generally designated as the "interpixel region" in FIG. 4. Moving from the central region of electrode 12a through the interpixel region and into the central region of electrode 12b, the electric field transitions from +6V in a direction perpendicular to electrodes 12a, 16 to −6V in a direction perpendicular to electrodes 12b, 16. As shown in FIG. 4, above the interpixel region between the pixels 12a, 12b this electric field (12V) dominates the alignment of the liquid cystal, forcing it to align parallel to the substrate 10 surface in the interpixel region. (This strong parallel electric field also removes the normal helix-like alignment of the liquid crystal. That and the lack of a reflective surface between pixels 12a, 12b leads to little or no transmission of light in the interpixel region, as shown in FIG. 4.)

As shown, in the interpixel region the liquid crystal tends to align with this relatively strong electric field (approximately 12V, resulting from the composite electric field from electrodes 12a, 12b). As a result, at the right side of the gap region (i.e., above electrode 12b) the liquid crystal tends to tilt opposite its normal tilt inclination. This corresponds to the beginning of the transition of the strong electric field parallel to the electrodes in the interpixel region to a field of −6V perpendicular to electrodes 12b, 16 at the central region of electrode 12b.

Thus, moving from the interpixel region toward the central region of electrode 12b, the electric field decreases in magnitude and changes direction, from parallel with respect to the substrate 10 surface to perpendicular with respect to the substrate 10 surface. At a certain point, the influence of the elastic energy of the liquid crystal to align according to its normal tilt inclination exceeds the influence of the electric field to hold it opposite its normal tilt inclination. At that distance, the liquid crystal will transition from its opposite tilt to its normal tilt. As shown in FIG. 4, separating these two regions there exists an artifact of liquid crystal alignment. It is commonly referred to as a "disclination" by those skilled in the art, or, more specifically, as the "reverse tilt disclination."

This disclination is referred to as the reverse tilt disclination because it separate regions of opposing tilt. This disclination results in an unwanted transmission of light. The transmission of light results in a spurious bright line across a portion of an otherwise darkened pixel.

The voltage applied to the electrode will determine where the disclination forms on the pixel surface. When the disclination is sufficiently close to the edge of the pixel, it could be masked by a dark matrix preformed on the passive plate. However, alignment of the dark matrix is difficult, especially for high fill LCDs. Misalignment of the mask will result in a loss of light transmission, thus reducing efficiency. Even if the matrix is positioned correctly, it will block transmission of some light from the pixel when it is in a "elit" state, thus reducing its efficiency. In such displays, avoiding use of a dark matrix mask is preferred.

It is thus an objective of the invention to reduce or eliminate the reverse tilt disclination on an LCD. It is also an objective to do so without a dark matrix mask, where there can be a significant loss of light transmission when the pixels of an LCD are in a lit state, and/or a loss of yield that can also result from misalignments of the dark mask (a loss that might otherwise be tolerable in low fill LCDs).

The present invention overcomes these disadvantages by eliminating the reverse tilt disclination. Because the disclination is eliminated through the internal make-up of the LCD, there is no need for a dark matrix mask and its resulting disadvantages.

In accordance with the present invention, the disclination is eliminated by displacing the bend deformation of the interpixel region. Displacement of the bend deformation is achieved by introducing a spacer material in the liquid crystal corresponding to the region between pixels. The spacer material displaces the liquid crystal, thus preventing development of the bend deformation and the resulting disclination when two adjacent pixels are operated in the inversion mode.

BRIEF DESCRIPTION OF THE DRAWINGS

For better understanding of the invention, reference is made to the following drawings which are to be taken in conjunction with the detailed description to follow.

DETAILED DESCRIPTION OF THE PREFERRED EMBODIMENT

Figure 4:
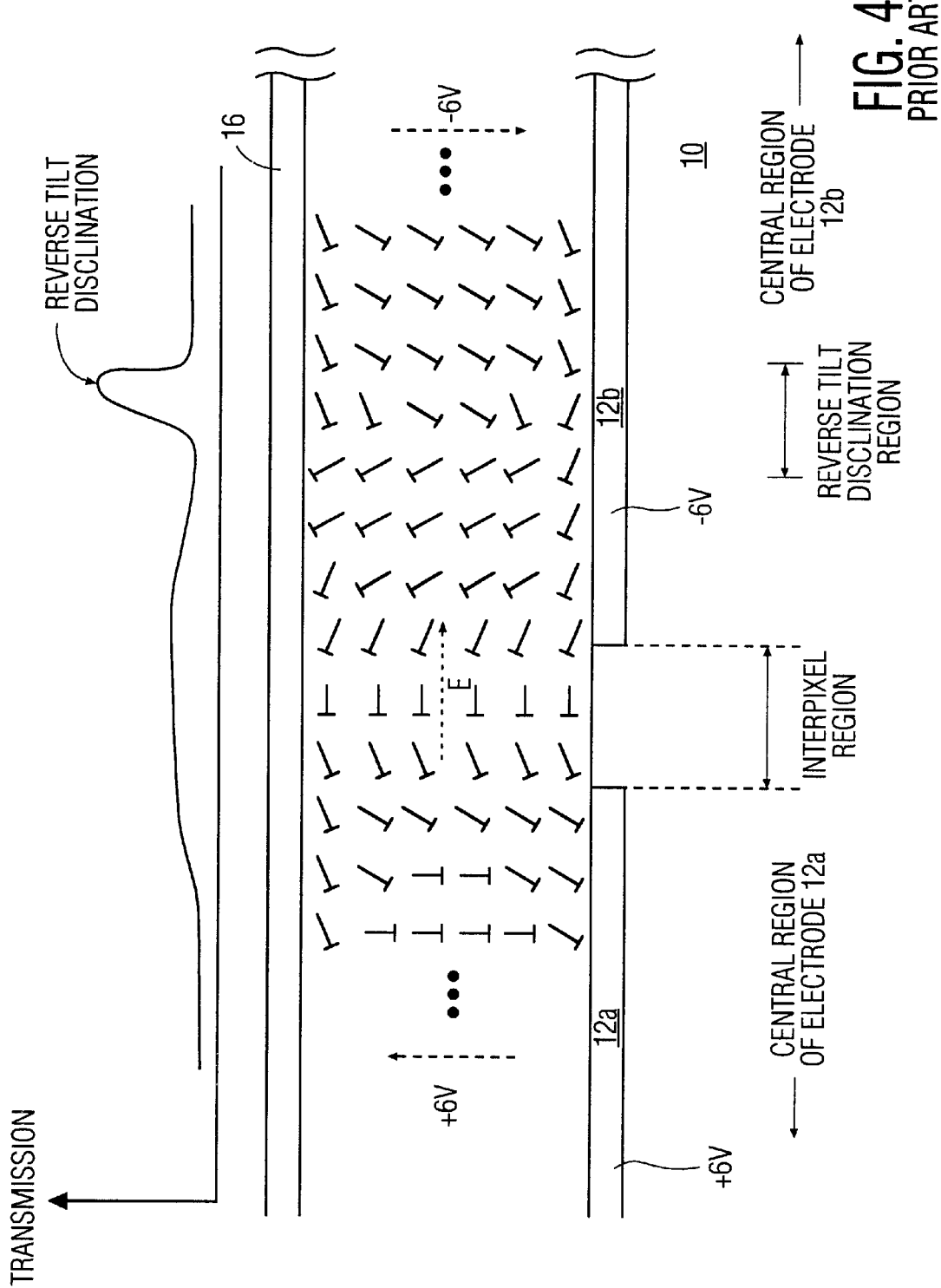
FIG. 4 is an illustration representing the alignment of the liquid crystal between the electrodes shown in FIG. 1 when the electrodes are in the inversion mode and a corresponding graphical representation of the transmission of light through the liquid crystal.
Figure 5:
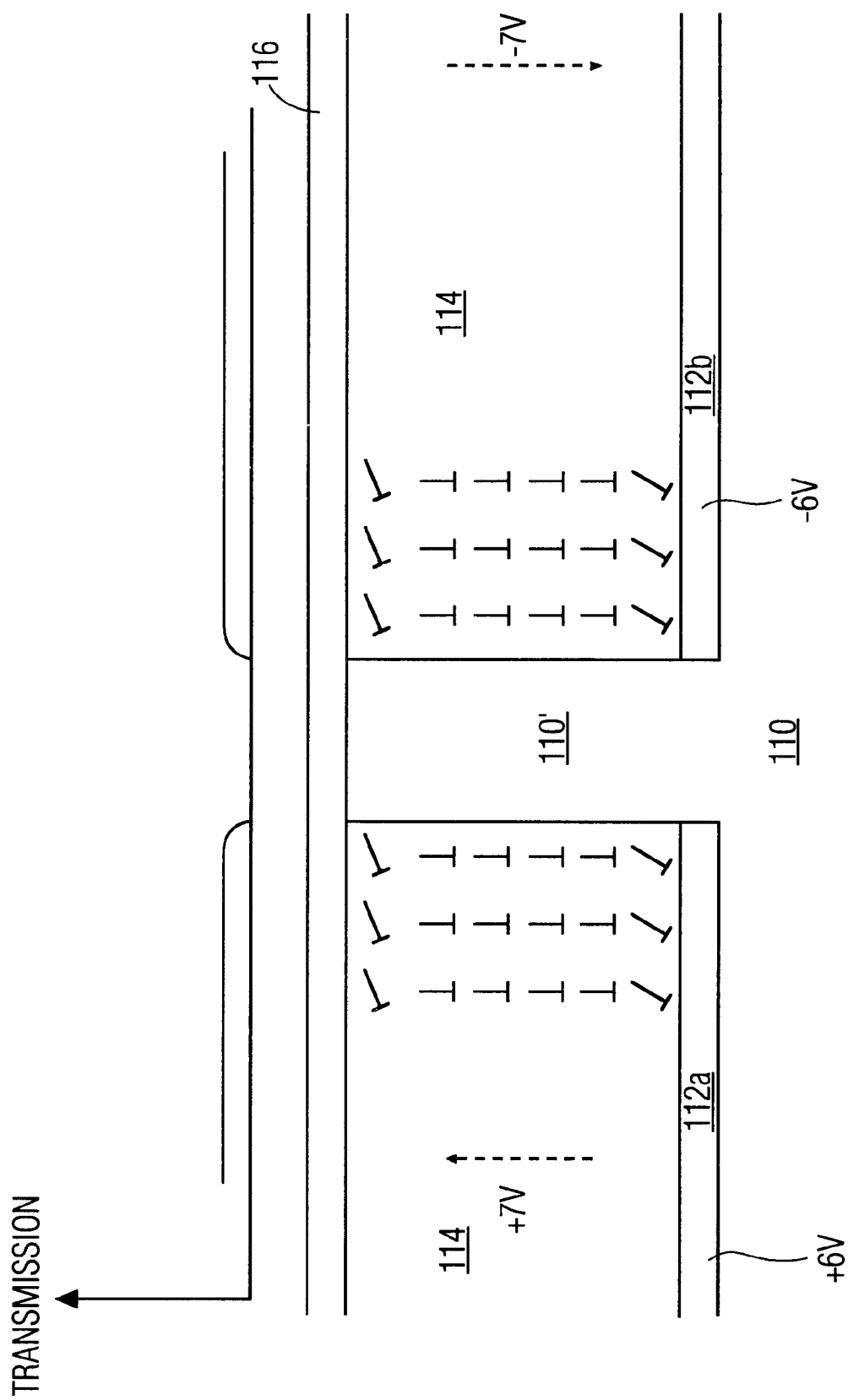
FIG. 5 is an illustration representing a cross section of a number of pixels of an LCD in accordance with the present invention and a corresponding graphical representation of the transmission of light through the liquid crystal.

Referring to FIG. 5, a cross-section of a portion of an LCD in accordance with the present invention is shown. The portion of FIG. 5 shown is analogous to the portion of the LCD of FIG. 4 described above. As seen in FIG. 5, the LCD is constructed on a silicon substrate material 110. A spacer 110' projects from the substrate 110 into the liquid crystal in the interpixel region (between electrodes 112a, 112b). (Although the spacer 110' is shown as contiguous with the substrate 110, it will be a different material, as described further below.)

A spacer 110 such as that shown in FIG. 5 will serve the function of maintaining a precise thickness of the liquid crystal layer 114 (the liquid crystal cell gap). In projection systems, where magnifications on the order of 50 to 100× are common, patterning spacers into the interpixel regions will reduce viewing artifacts associated with a random spacer distribution. A high contrast ratio and light throughput (brightness) will also be achieved.

Figure 5A:
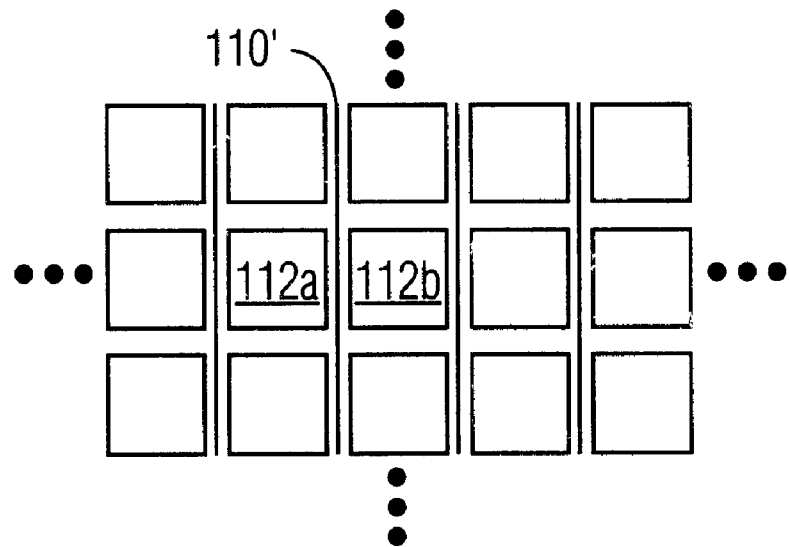
FIG. 5a is a partial top view of the LCD represented in cross-section in FIG. 5.
Figure 5B:
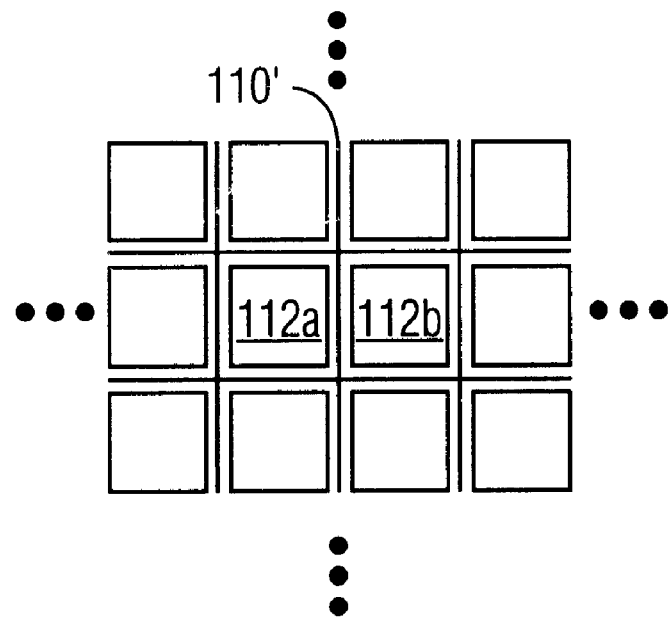
FIG. 5b is a partial top view of an alternative embodiment of the LCD represented in cross-section in FIG. 5.

In order for the spacer 110' to prevent formation of the bend deformation in the interpixel region, it must extend the length of the border region between adjacent pixels. Thus, as shown in FIG. 5a, the "spacers" are actually ribs, when viewed from above the LCD. FIG. 5a shows only ribs extending in one direction, between columns of pixels. This will suppress the formation of reverse tilt disclination when adjacent pixels in the same row (such as pixels corresponding to electrodes 112a, 112b) are in the inversion mode. To prevent a reverse tilt disclination when adjacent pixels in the same column are in inversion mode, both the rows and columns would have to have the ribs. (In other words, each pixel would be completely surrounded with the spacer material, as shown in FIG. 5b.)

Referring back to FIG. 5, even if the spacer 110' does not completely displace the liquid crystal in the interpixel region, i.e., there is a small region of liquid crystal between the spacer 110' and transparent electrode 116 and/or the spacer material does not span the entire width between electrodes 112a, 112b, formation of a reverse tilt disclination in the region above electrode 112b can be prevented. As described below, selection of an appropriate material for the spacer 110', particularly for cases when the spacer material does not fill the interpixel region, can further serve to impede the formation of the reverse tilt disclination.

Concentrating the strong electric field parallel to the electrode surfaces in the interpixel region when adjacent pixels are in inversion mode will help to eliminate the bend deformation and therefore the associated disclination. In general, the material used for the spacer 110' should have a dielectric constant that is significantly lower than that of the liquid crystal. If the spacer 110' has a dielectric constant greater than or equivalent to the liquid crystal, then the electric field distribution may support sufficient bend deformation in the surrounding liquid crystal to cause a disclination to form.

On the other hand, if the dielectric constant of the spacer is relatively low, for example, by a factor of two to ten times less than the liquid crystal, then it will further impede formation of a bend deformation in the liquid crystal surrounding the spacer 110' by focusing the field within the spacer itself. Thus, the electric field above the electrode stays relatively perpendicular to the electrode surface (or, equivalently, the lines of equipotential remain parallel to the electrodes across the entire length of the electrode, even adjacent the interpixel region). Thus, the liquid crystal aligns with its normal tilt inclination above all of electrode 112b, as shown in FIG. 5, even though adjacent pixels are in inversion mode.

For the case where the spacer material does not entirely fill the interpixel region, selecting a relatively low dielectric constant will eliminate the bend deformation. (With a sufficiently low dielectric constant, the spacer material does not have to entirely fill the interpixel region as shown in FIG. 5. Thus, the spacer material does not have to be so high as to fill the entire liquid crystal gap and/or can be thinner than the space between pixels, such as between pixels 12a and 12b.)

Figure 1:
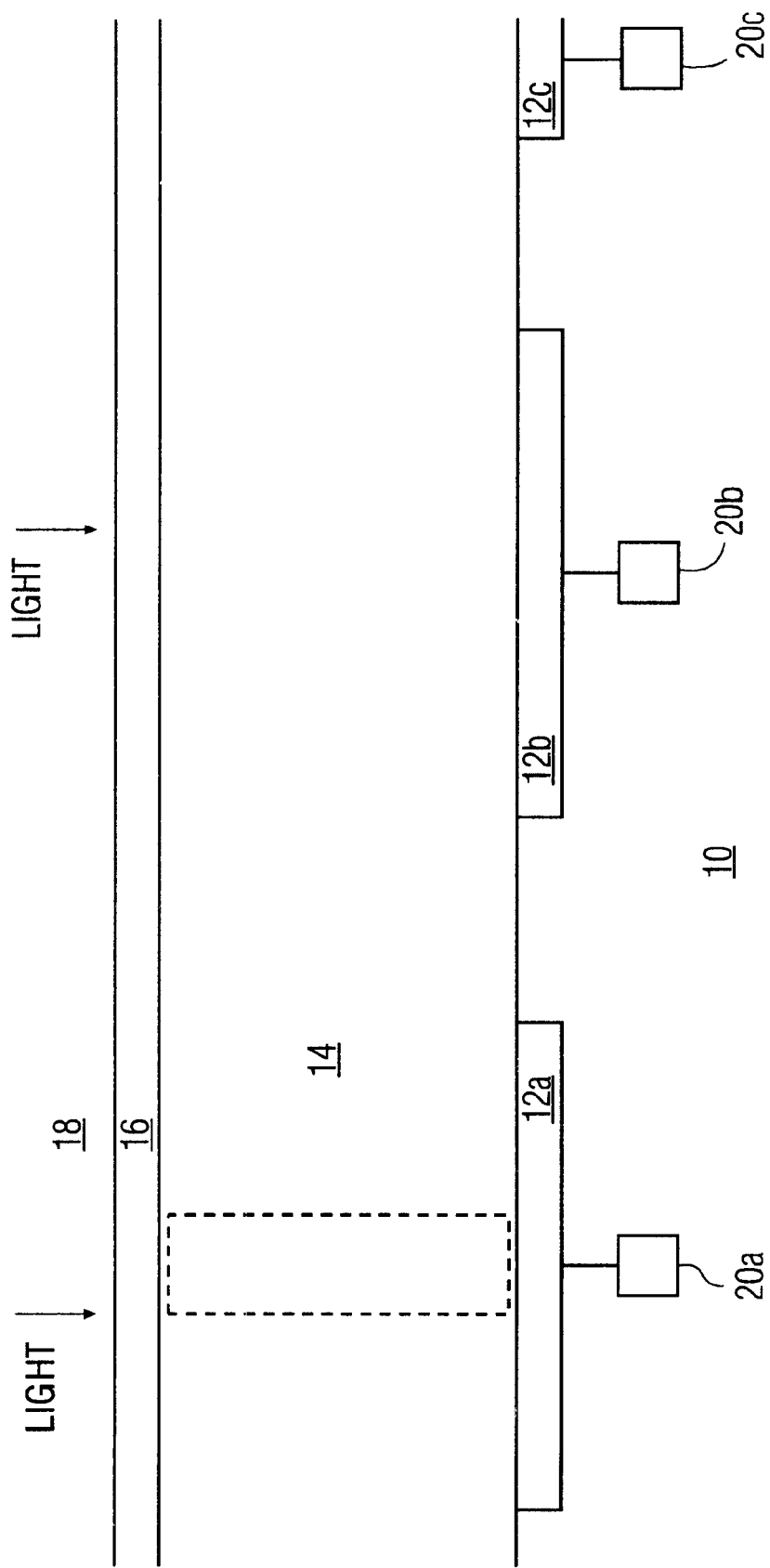
FIG. 1 is a illustration representing a cross section of a number of pixels of a known LCD.
Figure 2:
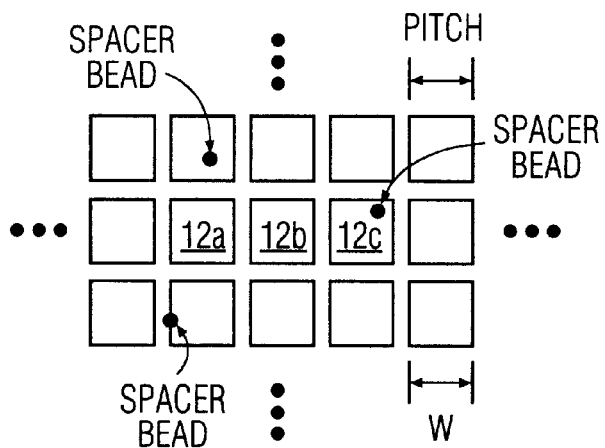
FIG. 2 is a partial top view of the LCD represented in cross-section in FIG. 1.
Figure 3:
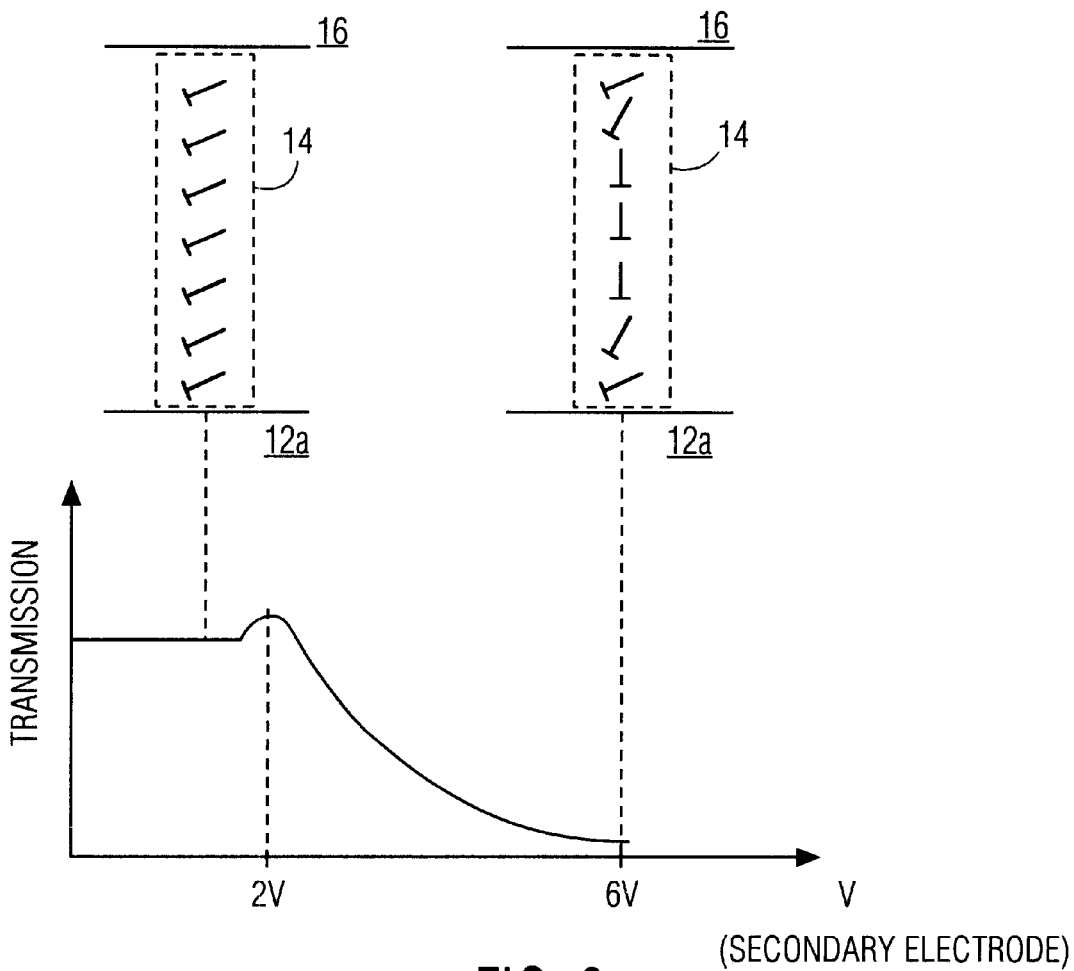
FIG. 3 is an illustration representing various states of the alignment of the liquid crystal within the portion represented with dashed lines of FIG. 1, and a corresponding graphical representation of the transmission of light through the liquid crystal.

Patterning of spacers to form ribs such as that shown in FIG. 5a (or completely surrounding each pixel, as in FIG. 5b) can be easily integrated into the process that constructs the active matrix and thus may be done in the same foundary that is used to construct the active matrix. As noted above and shown in FIG. 1, the prior art devices also had some type of spacer material to set the liquid crystal gap. For example, as discussed above, FIG. 2 shows a layer that has been patterned into a series of posts or columns extending between the substrate and the secondary electrode to set the liquid crystal gap.

Patterning of an insulating layer to create the rib style spacers shown in FIGS. 5 and 5a (or spacers completely surrounding each pixel, as in FIG. 5b) may be accomplished by modifying such existing techniques. The active matrix is constructed using known methods that leaves a grid of pixels (electrodes) of, for example, Al, exposed on the top surface of the substrate. The rib spacers may then be created by deposition of an insulating material and using a mask that will leave a rib pattern extending between pixels. Accordingly, the processes for creating the LCD of the present invention are readily available in most silicon foundaries.

Choice of materials and processing for creating the spacers 110' are very important to the quality of the device. A plasma enhanced chemical vapor deposition (PECVD) process is desired over sputtering or evaporation for adhesion, material quality, etchability and low temperature processing capability. The Al of the electrodes must remain below 250° C. during the processing of the spacer layer to avoid damage to the Al which results in reduced reflectivity and higher scattering.

As noted above, the material selected to construct the spacer and, in particular, one with a reduced dielectric constant, is important in eliminating the bend deformation in the interpixel region. Use of a PTEOS (plasma-tetra ethyl oxysilane) for the spacer in lieu of a plasma nitride ($SiN_x$) will be more effective. For example, where the liquid crystal has a permittivity of $10\epsilon_o$, a spacer using PECVD SiNx having a dielectric permittivity in the range of $4\epsilon_o$ to $8\epsilon_o$ has been found to be effective in eliminating the reverse tilt disclination. A spacer made of PECVD TEOS having a dielectric constant in the range of $1\epsilon_o$ to $3\epsilon_o$ is expected to be an improvement.

The above described embodiments are merely illustrations of the present invention. Numerous modifications and adaptations thereof will be readily apparent to those skilled in the art without departing from the spirit and scope of the present invention and the appended claims. Thus, the above description should be considered a representative embodiment of the invention and not a limitation on the scope of the invention.

What is claimed is:

1. A high density LCD comprising:
    secondary electrodes which are separated from each other solely by an interpixel region in both row and column directions;
    drive circuits for providing voltage levels to said secondary electrodes;
    a common electrode;
    a liquid crystal located between said secondary electrodes and said common electrode;
    said liquid crystal in at least a portion of the interpixel region being displaced by a spacer material which is arranged between adjacent secondary electrodes without overlap of said adjacent secondary electrodes, wherein the spacer material has a dielectric permittivity which is less than that of the liquid crystal, the spacer material suppressing the formation of a disclination near the interpixel region when pixels on opposite sides of the spacer material are operating in an inversion mode, wherein the high density LCD has a fill factor of at least 90%.

2. An LCD as claimed in claim 1, wherein a spacer material prevents formation of a reverse tilt disclination in the liquid crystal of one of the pixels operating in the inversion mode by displacing a bend deformation in the liquid crystal at the interpixel region.

3. An LCD as claimed in claim 1, wherein the dielectric permittivity of the liquid crystal is above $5\epsilon_o$ and the dielectric permittivity of the spacer material is less than $5\epsilon_o$.

4. An LCD as claimed in claim 1, wherein the dielectric permittivity of the liquid crystal is on the order of $10\epsilon_o$ and the dielectric permittivity of the spacer material is on the order of $1\epsilon_o$ to $6\epsilon_o$.

5. An LCD as claimed in claim 1, wherein the dielectric permittivity of the spacer material is at least a factor of two less than that of the liquid crystal.

6. An LCD as claimed in claim 5, wherein the dielectric permittivity of the spacer material is a factor of two to ten times less than that of the liquid crystal.

7. An LCD as claimed in claim 1, wherein the spacer material is selected from the group consisting of PECVD SiNx and PECVD TEOS.

8. An LCD comprising:
    secondary electrodes which are separated from each other by an interpixel region;
    drive circuits for providing voltage levels to said secondary electrodes;
    a common electrode; and
    a liquid crystal located between said secondary electrodes and said common electrode;

characterized in that:

said liquid crystal in at least a portion of the interpixel region is displaced by a spacer material which is arranged between adjacent secondary electrodes and extends vertically into the liquid crystal from a first substrate of the LCD in the interpixel region without overlap of said adjacent secondary electrodes, and the spacer material has a dielectric permittivity which is less than that of the liquid crystal, the spacer material suppressing the formation of disclination near the interpixel region when pixels on opposite sides of the spacer material are operating in an inversion mode, wherein the LCD has a fill factor of at least 90%.

9. An LCD as claimed in claim 8, wherein the spacer material prevents formation of a reverse tilt disclination in the liquid crystal of one of the pixels operating in the inversion mode by displacing the bend deformation in the liquid crystal at the interpixel region.

10. An LCD as claimed in claim 8, wherein the spacer material extends vertically to a common electrode of the LCD.

11. An LCD as claimed in claim 8, wherein the spacer material extends vertically less than the distance to a common electrode of the LCD.

12. An LCD as claimed in claim 8, wherein the spacer material extends the distance between the secondary electrodes of the pixels.

13. An LCD as claimed in claim 8, wherein the spacer material extends less than the distance between the secondary electrodes of the pixels.

14. An LCD as claimed in claim 8, wherein the dielectric permittivity of the liquid crystal is on the order of $10\epsilon_o$ and the dielectric permittivity of the spacer material is on the order of $1\epsilon_o$ to $6\epsilon_o$.

15. An LCD comprising:

secondary electrodes which are separated from each other by an interpixel region;

drive circuits for providing voltage levels to said secondary electrodes;

a common electrode; and a liquid crystal located between said secondary electrodes and said common electrode;

characterized in that said liquid crystal in at least a portion of the interpixel region is displaced by a spacer material which extends as a plurality of ribs, each rib extending continuously between a first plurality of respective secondary electrodes to one side of the rib, and a second plurality of respective secondary electrodes to the other side of the respective ribs, and the spacer material has a dielectric permittivity which is less that that of the liquid crystal, the spacer material suppressing the formation of a disclination near the interpixel region when pixels on opposite sides of a respective rib are operating in an inversion mode, wherein the LCD has a fill factor of at least 90%.

16. An LCD as claimed in claim 15, wherein the ribs prevent formation of a reverse tilt disclination in the liquid crystal of one of the pixels operating in the inversion mode by displacing the bend deformation in the liquid crystal at an interpixel region.

17. An LCD as claimed in claim 15, wherein the ribs extends vertically to a common electrode of the LCD.

18. An LCD as claimed in claim 15, wherein said ribs separate columns of pixels in the LCD.

19. An LCD as claimed in claim 15, wherein said ribs separate rows of pixels in the LCD.

20. An LCD as claimed in claim 15, wherein the dielectric permittivity of the liquid crystal is on the order of $10\epsilon_o$ and the dielectric permittivity of the spacer material is on the order of $1\epsilon_o$ to $6\epsilon_o$.

* * * * *

UNITED STATES PATENT AND TRADEMARK OFFICE
CERTIFICATE OF CORRECTION

PATENT NO. : 6,473,149 B2
DATED : October 29, 2002
INVENTOR(S) : George A. Melnik, Robert H. Kane, Ronald D. Pinker and Gerard Cnossen It is certified that error appears in the above-identified patent and that said Letters Patent is hereby corrected as shown below:

<u>Title page,</u>
Item [73], Assignee, change "Phillips" to -- Philips --.

Signed and Sealed this

Twenty-fifth Day of March, 2003

JAMES E. ROGAN
*Director of the United States Patent and Trademark Office*